US008345125B2

(12) United States Patent
Kirsch et al.

(10) Patent No.: US 8,345,125 B2
(45) Date of Patent: Jan. 1, 2013

(54) OBJECT DETECTION USING AN IN-SENSOR DETECTOR

(75) Inventors: Graham Kirsch, Tadley (GB); Anthony Huggett, Basingstoke (GB)

(73) Assignee: Aptina Imaging Corporation, George Town, Grand Cayman (KY)

( * ) Notice: Subject to any disclaimer, the term of this patent is extended or adjusted under 35 U.S.C. 154(b) by 551 days.

(21) Appl. No.: 12/544,842

(22) Filed: Aug. 20, 2009

(65) Prior Publication Data

US 2010/0315523 A1 Dec. 16, 2010

(51) Int. Cl.
H04N 5/262 (2006.01)
(52) U.S. Cl. .................................... 348/239; 348/218.1
(58) Field of Classification Search ............... 348/222.1, 348/239, 207.99, 218.1; 382/103, 118, 291, 382/299

See application file for complete search history.

(56) References Cited

U.S. PATENT DOCUMENTS

| 8,106,965 B2 * | 1/2012 | Shimizu ........................ 348/234 |
| 2002/0089516 A1 * | 7/2002 | Sobol ............................ 345/620 |
| 2009/0079860 A1 * | 3/2009 | Li ............................. 348/333.12 |
| 2011/0164144 A1 * | 7/2011 | Okamoto ................... 348/222.1 |

FOREIGN PATENT DOCUMENTS

| GB | 2471647 | 1/2011 |
| JP | 2002152587 A | 5/2002 |
| WO | 2006001525 A1 | 1/2006 |
| WO | 2007140523 A1 | 12/2007 |

OTHER PUBLICATIONS

Artyomov et al., "Morton (Z) Scan Based Real-Time Variable Resolution CMOS Image Sensor" IEEE Transactions on Circuits and Systems for Video Technology, vol. 15, No. 7, pp. 145-148.

Yan et al., "The Practical Method of Fractal Dimensionality Reduction Based on Z-Ordering Technique" Advanced Data Mining and Applications, Second International Conference, 2006, pp. 542-549.
Julien Meynet, "Fast Face Detection Using AdsBoost" Technical Report, Jul. 16, 2003, pp. 1-94.
Yoav Freund and Robert E. Schapire, "A decision-theoretic generalization of on-line learning and an application to boosting" AT&T Bell Laboratories, Sep. 20, 1995, pp. 1-34.
Yoav Freund and Robert E. Schapire, "A Short Introduction to Boosting" Journal of Japanese Society for Artificial Intelligence, Sep. 1999, 14(5):771-780.
Morton, "A Computer Oriented Geodetic Data Base and a New Technique in File Sequencing." International Business Machines Co., 1966, 32 pages. Summary only, retrieved from http://books.google.com/books? id=9FFdHAAACAAJ&dq=A+Computer+Oriented+Geodetic+Data+Base+and+a+New+Technique+in+File+Sequencing.&hl=en&sa=X&ei=NNkiT-O6DOb30gH_wum3CA&ved=0CDgQ6AEwAA on Jan. 27, 2012.

* cited by examiner

*Primary Examiner* — Tuan Ho
(74) *Attorney, Agent, or Firm* — Kramer Levin Naftalis & Frankel LLP

(57) ABSTRACT

Systems and methods are provided for detecting an object of object class, such as faces, in an image sensor. In some embodiments, the image sensor can provide a scan sequence that scans a scene over multiple time intervals. The image sensor can scan, in succession, portions of a scene, where each of the portions covers a different amount or location of the scene. This way, the scanned portions can be saved in an image buffer that is sized significantly smaller than an entire frame. In some embodiments, when the image sensor detects the presence of an object of the object class, the image sensor can store positional information (e.g., location and size of the object) in a region of interest buffer. The image sensor can output the positional information to aid an electronic device, such as a camera, perform various functions, such as automatic exposure and color balancing.

19 Claims, 6 Drawing Sheets

OBJECT DETECTION USING AN IN-SENSOR DETECTOR

CROSS-REFERENCE TO RELATED APPLICATION

This claims the benefit of G.B. Patent Application No. 0910386.2, filed Jun. 16, 2009, the entirety of which is hereby incorporated herein by reference.

FIELD OF THE INVENTION

This is directed to systems and methods for capturing and analyzing a scene using an image sensor.

BACKGROUND OF THE DISCLOSURE

Modern cameras and other image capturing devices offer a wide variety of capabilities, such as automatic exposure, color balancing, and open eye detection. These capabilities depend on the camera's ability to determine where the regions of interest are in the scene, such as the location and size of the faces.

To determine the location and size of these objects, cameras typically include a dedicated memory that is large enough to store an entire frame of the scene. This dedicated memory is often referred to as a "framestore" and can be undesirably large and area-consuming. Once an entire frame is stored in the framestore, a high-power processor repeatedly fetches and analyzes data from the framestore to identify the faces (or other objects) of interest. This process of identifying objects may take up a large proportion of the processing time and power in a camera.

DETAILED DESCRIPTION OF THE DISCLOSURE

Figure 1:
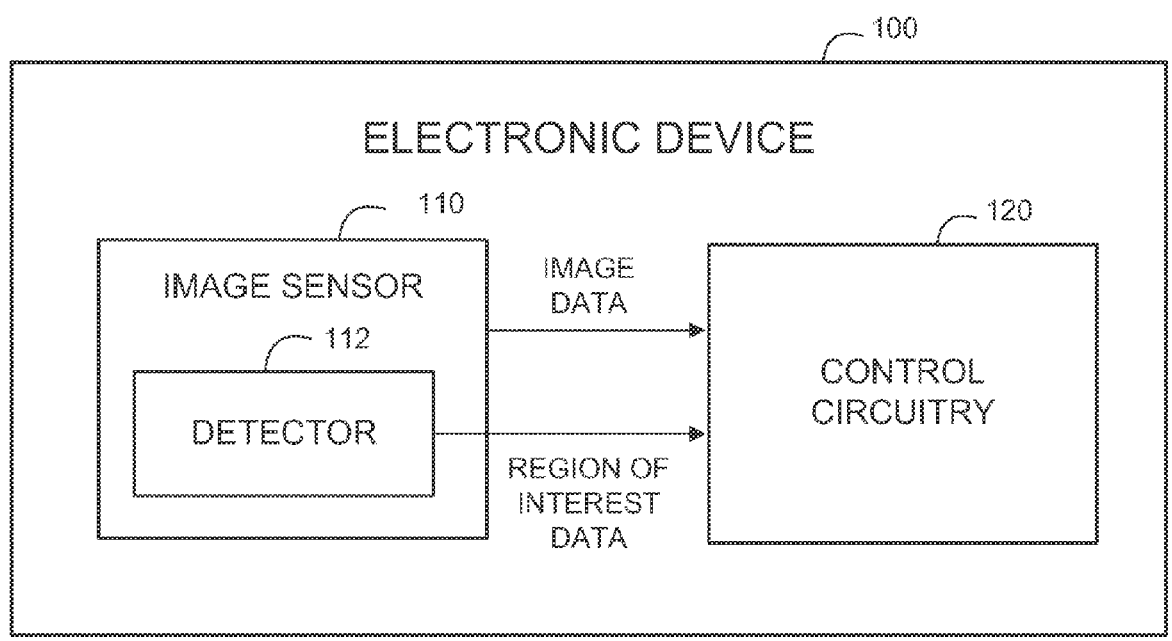
FIG. 1 is a schematic view of an illustrative electronic device configured in accordance with embodiments of the invention.

FIG. 1 is a schematic view of an illustrative electronic device configured in accordance with embodiments of the invention. Electronic device 100 can be any type of user device that utilizes an image sensor (embodied here as image sensor 110) and is controlled generally by control circuitry 120. For example, electronic device 100 can include a camera, such as a computer camera, still camera, or portable video camera. Electronic device 100 can also include any other components in a typical camera (or otherwise), which are not depicted in FIG. 1 to avoid any distraction from embodiments of the invention.

Image sensor 110 can capture image data (e.g., pixels) corresponding to a scene. A "scene" hereinafter refers to a streaming image that can be captured in the frame of a camera. Image sensor 110 may include detector 112 for identifying relevant information about the scene. For example, detector 112 may analyze the image data for the presence of particular objects. These objects may belong to a particular object class, such as faces.

As used herein, an "object class" may refer to a collection of objects sharing common attributes, but where individual objects in the collection may appear differently. For example, faces may be an object class, because although each individual face is distinguishable from other faces, faces have a number of characteristic features such as two eyes, a nose, a mouth, and a chin. Another example of an object class is a bird object class (e.g., with characteristic features of a beak and two wings). For simplicity, the various embodiments disclosed herein will be described in terms of detecting faces. However, it should be understood that this is merely illustrative, and that objects of any other object class may be detected instead (e.g., birds or other animals).

Detector 112 may detect for the presence of faces, and can provide relevant information about any of the detected faces to control circuitry 120. The relevant information is identified in FIG. 1 as "region of interest data," and can include positional information about the detected faces, such as the general location of the faces (e.g., x-y coordinates), the size of the faces, and how certain image sensor 110 is of the presence of the faces at each location.

Control circuitry 120 may process the image data and region of interest data generated by sensor 110, and may perform any suitable operations based on this data. For example, because users of electronic device 100 may want faces to remain clear and bright, control circuitry 120 can perform automatic exposure, color balancing, or focus control (or any combination thereof) based on the provided positional information of the detected faces. In some embodiments, control circuitry 120 can identify further contextual information about the detected faces, such as information on whether the faces include open eyes and/or a smile. In these or other embodiments, control circuitry 120 can provide or update system functions based on the detected faces. For example, if electronic device 100 includes a computer and a computer camera (e.g., webcam), control circuitry 120 may be configured to wake up a "hibernating" computer in response to detecting that a face is present in front of the computer camera. This way, the user does not need to perform any express actions to restart the computer.

Because control circuitry 120 is provided with positional information about the faces in a scene, control circuitry 120 may not need to perform any face detection functions itself. Thus, in some embodiments, substantial processing time and power may be saved, since control circuitry 120 may immediately (if desired) begin performing the above-described capabilities, such as automatic exposure, color balancing, and focus control.

Detector 112 (or image sensor 110 in general) and control circuitry 120 may be implemented using any suitable combination of hardware and software. In some embodiments, detector 112 can be implemented substantially all in hardware. For example, image sensor 110 may be implemented as a system-on-a-chip (SoC). This way, detector 112 can have a small design that minimizes the area of image sensor 110, and detector 112 may have circuit components designed to maximize the speed of operation. Control circuitry 120 may include, for example, one or more processors, microprocessors, ASICS, FPGAs, or any suitable combination of hardware and software.

Figure 2:
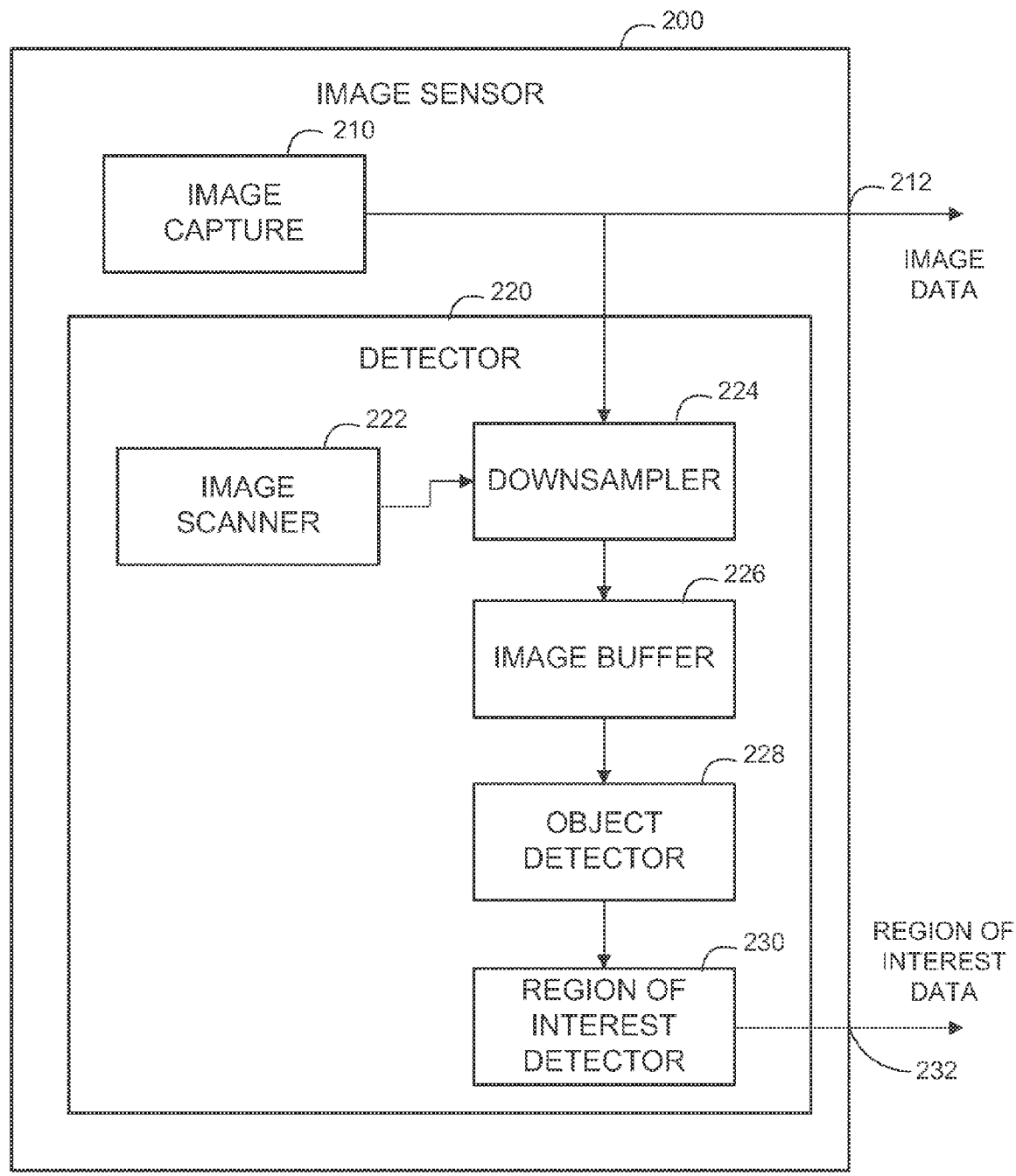
FIG. 2 is a schematic view of an illustrative image sensor configured in accordance with embodiments of the invention.

Referring now to FIG. 2, a schematic view of image sensor 200 is shown, which may be configured in accordance with embodiments of the invention. Image sensor 200 may or may not have any of the features and functionalities of image sensor 110 of FIG. 1 (and vice versa). In some embodiments, image sensor 110 can include image capture module 210 and detector 220. Detector 220 can include any of the features or functionalities of detector 112 of FIG. 1 (and vice versa).

Image capture module 210 can include any combination of lenses, arrays of cells (e.g., charge-coupled devices (CCDs) or CMOS sensor cells), and any other suitable components. Using these components, image capture module 202 can generate image data (e.g., pixels) corresponding to a scene. In some embodiments, image capture module 210 may provide the image data corresponding to a scene in raster order and at any suitable frame rate (e.g., 15 or 28 frames per second).

Image sensor 200 can include a first output 212 for outputting the image data generated by image capture module 210. In some embodiments, detector 220 can tap into the output of image capture module 210. Detector 220 may only need the luminance information to detect for the presence of faces, and therefore (in some embodiments), detector 220 may tap into just the luminance channel of the image data (e.g., Y channel, G channel of RBG image, or Gr/Gb channel). To perform the task of detecting faces, detector 220 can include image scanner 222, downsampler 224, image buffer 226, object detector 228, and region of interest buffer 230.

As discussed above, image capture module 210 may repeatedly provide pixels for an entire frame of a scene in successive time intervals (e.g., every 0.033 seconds for a 30 frames per second frame rate). Image scanner 222 can control which portion of the scene is scanned and stored into image buffer 226 at each time interval. In some embodiments, image scanner 222 may select a sequence of different portions that each covers a different location or amount of the scene. This way, while each individual portion does not provide information about the entire scene, all of the selected portions may collectively provide sufficient coverage of the scene. Using this approach, image scanner 222 can essentially capture the full scene over a longer period of time so that only a portion of the scene (rather than the entire scene) is saved in image buffer 226 at one time. The remaining components and various details of image sensor 200 will be described in greater detail below.

Figure 3:
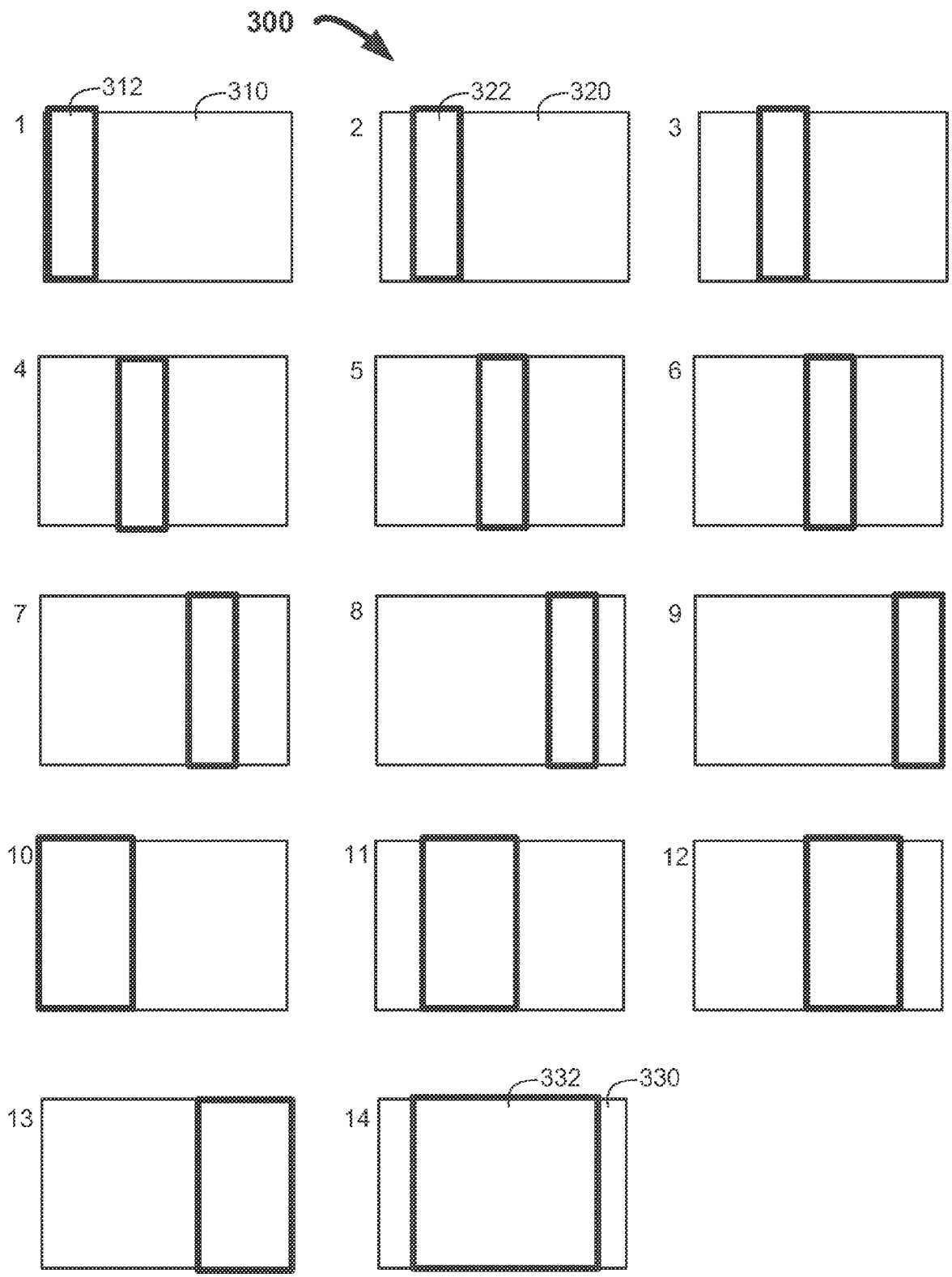
FIG. 3 illustrates various scanning stripes that can be used to capture a scene in successive time intervals in accordance with embodiments of the invention.

First, FIG. 3 will be described with continued reference to image scanner 222 of FIG. 2. FIG. 3 shows one example of a sequence 300 of portions that image scanner 222 can select in successive frames. Sequence 300 can include 14 portions, which may be selected in 14 successive time intervals (e.g., successive frames). For example, image scanner 222 may select portion 312 of scene 310 during a first raster scan of the scene, portion 322 of scene 320 during a second raster scan of the scene, all the way until portion 332 of scene 330 during a fourteenth raster scan of the scene.

As shown in FIG. 3, the portions in sequence 300 may be vertical stripes that extend from the top to the bottom of the frame, but may not cover the entire width of the scene. Each of the vertical stripes may differ from the other vertical stripes in width, area, or both. For example, the first nine vertical stripes may have the same width, but different horizontal offsets. The next four vertical stripes may have a larger width, again with different horizontal offsets. The final, fourteenth vertical stripe may have a width even larger than the width of the previous thirteen vertical stripes. While scan shapes other than vertical stripes may be used, for simplicity, the various embodiments will be described in terms of scanning vertical stripes. It should be understood that this is merely illustrative and is not intended to be limiting. For example, vertical stripes that do not span the entire row may be used instead.

The vertical stripes of sequence 300 in FIG. 3 may be chosen to provide sufficient coverage of the scene. More particularly, the widths and horizontal offsets of the stripes can be selected such that faces at different positions and of different sizes may be detectable by image sensor 200 (FIG. 2). The stripes with smallest width, for example, can be used to detect smaller faces (e.g., faces of people far away from the camera), while the stripes with larger widths may be useful for detecting larger faces (e.g., faces of people closer to the camera). In embodiments where frames are scanned at 15 frames per second, the 14 scan stripes of FIG. 3 may be completed within one second. This way, as long as the people in scene do not move a significant amount in one second (which is likely, particularly if they are posing for a camera), any positional information generated by image sensor 200 should remain valid after sequence 300 is completed.

Image scanner 222 can use any number of vertical stripes in each sequence, and not just 14 vertical stripes. As discussed above, the number of stripes may be selected to cover the enter scene. In some embodiments, the number of vertical stripes may be chosen based on the number of columns in the image and/or the scale of the highest resolution scan performed (or equivalently, the width of the narrowest vertical stripe). For example, the number of vertical stripes of each resolution may be chosen such that each vertical stripe is 64*S pixels wide and such that the vertical stripes overlap one another by 32*S pixels. Here, S may represent a number referred to as a "scale" and may be greater for wider vertical stripes. As will become apparent below, this may allow image scanner 222 to provide sufficient coverage of the scene at each scale.

In some embodiments, image scanner 222 can scan a scene using a predetermined sequence of vertical stripes. For example, image scanner 222 may be configured to follow the sequence 300 of FIG. 3 regardless of the detection results of detector 220 (or other factors). In other embodiments, image scanner 222 may not follow a predetermined sequence, and may instead select the width and position of the vertical stripes in an adaptive manner. For example, if detector 220 determines that a face is present in one of the vertical stripes, image scanner 222 may select vertical stripes that are the same or are similar (e.g., in width and/or position) as that vertical stripe. This way, image scanner 222 may attempt to follow the person's face as he or she moves around the scene.

Returning to FIG. 2, in some embodiments, image scanner 222 can control the scan sequence by providing scan settings to downsampler 206 at each time interval. The scan settings can include, for example, the position (e.g., horizontal offset or x-y coordinates) and width (e.g., downsampling rate) of the vertical stripes. Using the scan settings, downsampler 224 can sub-sample a portion the image data at any suitable rate. For example, downsampler 224 can average groups of pixels, where the groups can be of any suitable size (e.g., $2^S$ for a suitable scale S, such as 4, 16, or 32 pixels, etc.) depending on the given rate. By downsampling the image data at a higher rate/scale, downsampler 224 can generate a wider vertical stripe without increasing the amount of memory needed to store the vertical stripe. Thus, for the example of FIG. 3, downsampler 224 may downsample the first nine vertical stripes using a first rate (or first scale $S_1$), the next four vertical stripe using a second rate (or second scale $S_2$) greater than the first rate, and the last vertical stripe using a third rate (or third scale $S_3$) greater than the first and second rates.

Image buffer 226 can be used for storing the downsampled image data from downsampler 224. Image buffer 226 can include any suitable form of volatile memory, such as SDRAM or RAM, or can include a non-volatile memory. The downsampled image data may be stored and/or read out in any order (e.g., raster order or Z-order). Z-order is discussed in greater detail in G.B. Patent Application No 0910387.0, filed Jun. 16, 2009, entitled "USE OF Z-ORDER DATA IN AN IMAGE SENSOR," which is hereby incorporated herein by reference in its entirety. Image buffer 226 can be sized to store less than an entire frame of a scene. In fact, as described in greater in connection with FIGS. 4 and 5, image buffer 226 may be sized to store a portion of a vertical stripe.

Image buffer 226 may be operated as a "rolling buffer," in which the oldest data is overwritten after image buffer 226 is filled up. Object detector 228 may perform face detection using the contents of image buffer 226 while image buffer 226 is being filled. To ensure that all faces are detected, object detector 228 may on operate at a speed fast enough so that detection is completed on a set of stored pixels before those pixels are overwritten.

Figure 4:
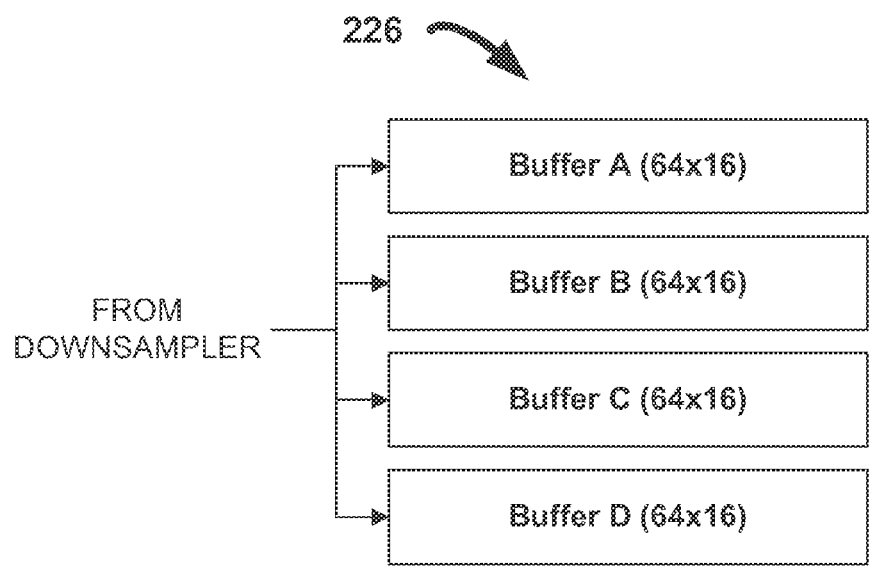
FIG. 4 is a schematic view of an illustrative image buffer configured in accordance with embodiments of the invention.
Figure 5:
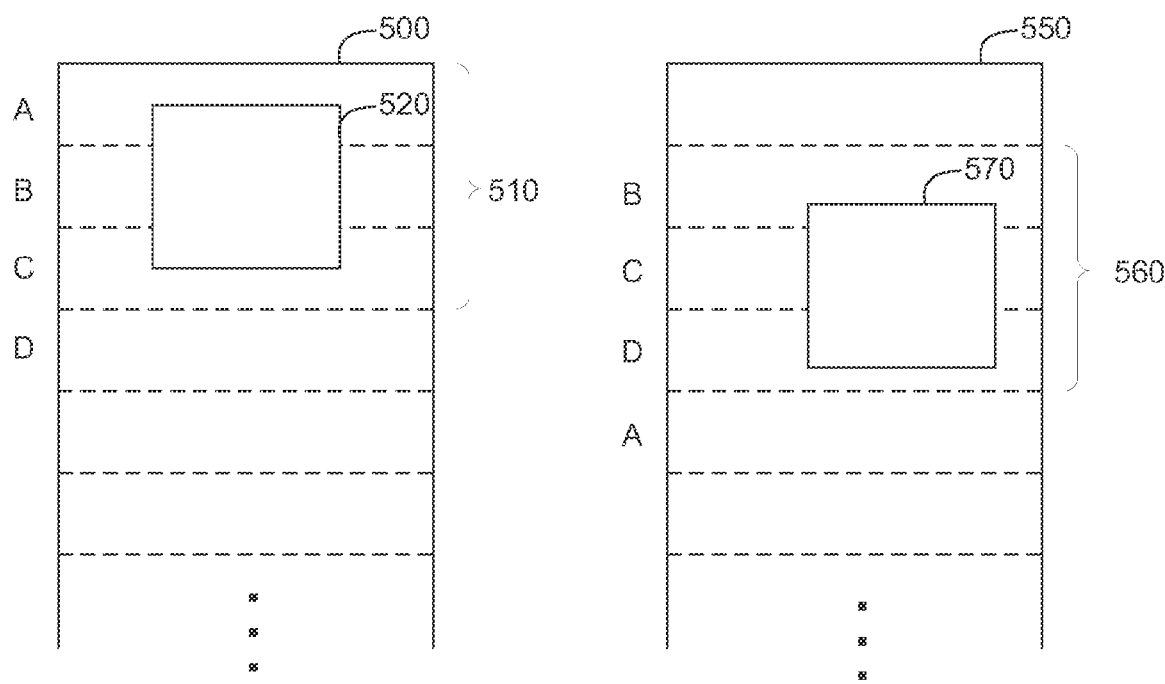
FIG. 5 illustrates various blocks selected from scanned stripes that can be used for object class detection in accordance with embodiments of the invention.

Turning now to FIGS. 4 and 5, these figures illustrate how object detector 228 can perform face detection while image data is being scanned into image buffer 226. In particular, FIG. 4 is a more detailed schematic view of some embodiments of image buffer 226, and FIG. 5 illustrates how object detector 228 might operate in conjunction with image buffer 226. Thus, FIGS. 4 and 5 will be described with continued reference to the components of FIG. 2.

Turning first to FIG. 4, in some embodiments, image buffer 226 can include four separate buffers so that three buffers are available for face detection while image data is being scanned into the fourth buffer. The four buffers in FIG. 4 are labeled as Buffers A, B, C, and D. The four buffers may be referred to as "partitions" of image buffer 226, although it should be understood that the four partitions can be completely separate buffers or four parts of the same buffer. In other embodiments, image buffer 226 can include more or less than four partitions.

Each of Buffers A, B, C, and D can have any suitable size. As one example, each of Buffers A, B, C, and D can include 64 pixels×16 lines of storage. In some embodiments, Buffers A, B, C, and D may each include two buffers—one to hold odd lines of a vertical stripe and the other to hold even lines.

Referring now to FIG. 5, one way to fill Buffers A, B, C, and D with portions of a vertical stripe is shown. FIG. 5 shows vertical stripes 500 and 550, which represent the same vertical stripe but at different points in time. Vertical stripes 500 and 550 may be scanned and stored into image buffer 226 in raster order. In particular, starting at the top of vertical stripe 500, the first set of lines (e.g., 16 lines) of vertical stripe 500 may first be stored in Buffer A, and then the second set of lines (e.g., 16 lines) may be stored in Buffer B, etc. While the fourth set of lines is stored in Buffer D, Buffers A, B, and C may contain valid data corresponding to top portion 510. Thus, object detector 228 may detect for faces in top portion 510 at the same time that Buffer D is being filled. If each of Buffers A, B, C, and D is 64 pixels wide×16 lines, top portion 510 may be 64 pixels wide×48 lines.

To perform detection, object detector 228 can select blocks of a predetermined size (e.g., 32 pixels×32 pixels). For example, object detector 228 can select block 520, as well as blocks of this size at any other position within top portion 510. The number of blocks that are selected may depend on the speed at which face detection can be performed on each block, since eventually the data in Buffer A may be over-written once Buffer D is filled up.

Object detector 228 can analyze each block and may determine whether a face is centered within each block. Object detector 228 can use any of a variety of techniques for identifying whether a face is presence in a block. For example, object detector 228 can determine whether the location of edges and smooth portions in the block indicate that a face is centered within the block. Edges may be present, for example, at the eyes and nose of a face, while smooth portions may be present on the forehead of a face. In some embodiments, object detector 228 may perform face detection using any of the techniques discussed in the above-incorporated G.B. Patent Application No. 0910387.0.

Once Buffer D is filled up, the first set of lines stored in Buffer A may be over-written with the fifth set of lines in the vertical stripe. This scenario is illustrated by vertical stripe 550 of FIG. 5. Since Buffer D is now filled with valid image data, Buffers B, C, and D may contain valid data corresponding to portion 560 of the vertical stripe. Thus, while Buffer A is being filled, object detector 228 can select blocks of the predetermined size (e.g., 32×32 blocks) from Buffers B, C, and D, such as block 570, and perform face detection on these blocks.

Accordingly, as illustrated by vertical stripes 500 and 550 in FIG. 5, face detection can be performed concurrently with the raster scan of downsampled image data. Image buffer 226 may therefore have a size that is not only smaller than the size of a framestore, but can be smaller (even significantly smaller) than the size of a vertical stripe. This can allow for a practical implementation of a detector within an image sensor, which might otherwise be infeasible.

Returning to FIG. 2, if object detector 228 detects the presence of a face within a 32×32 block, object detector 228 may save positional information corresponding to that block in region-of-interest buffer 230. The positional information can include, for example, the location of the block (e.g., the x-y coordinates of a corner of the block), the downsampling rate used to obtain the block, and the strength of detection. This way, object detector 228 can provide a general region (e.g., a 32×32 block) that may be of interest to, for example, control circuitry 120 of FIG. 1.

In some embodiments, region of interest buffer 230 may be a first-in first-out (FIFO) buffer. In these embodiments, information about the detected faces may be provided from buffer 230 in the order that the faces are detected. Image sensor 200 may include second output 232, which allows image sensor 200 to provide the positional information from region of interest buffer 230 to external components (e.g., control circuitry, such as control circuitry 120 of FIG. 1). Image sensor 200 may provide the positional information from buffer 230 at any suitable time, such as in response to requests from the external components or automatically.

Figure 6:
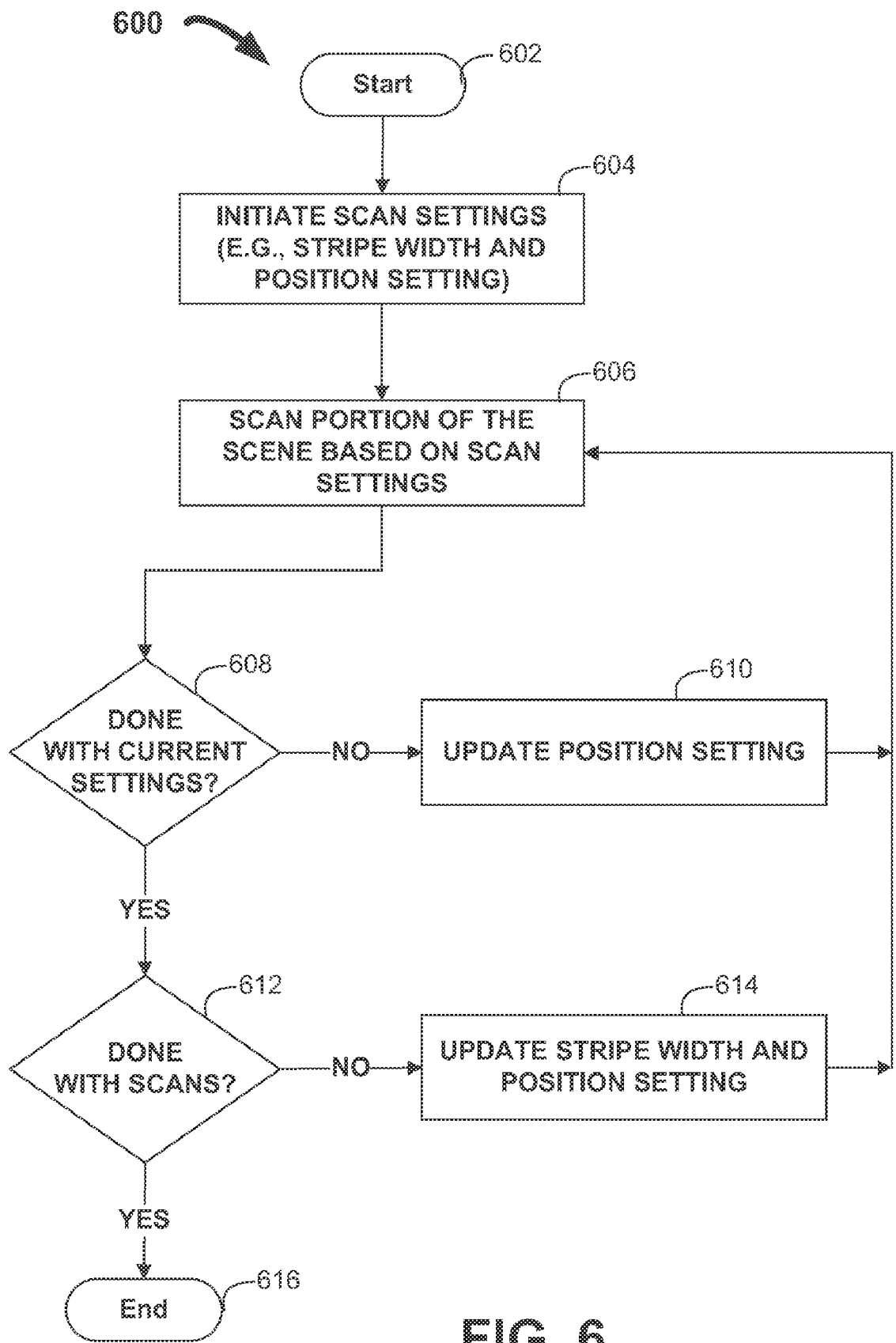
FIG. 6 is a flowchart of an illustrative process for scanning a scene in successive time intervals in accordance with embodiments of the invention.
Figure 7:
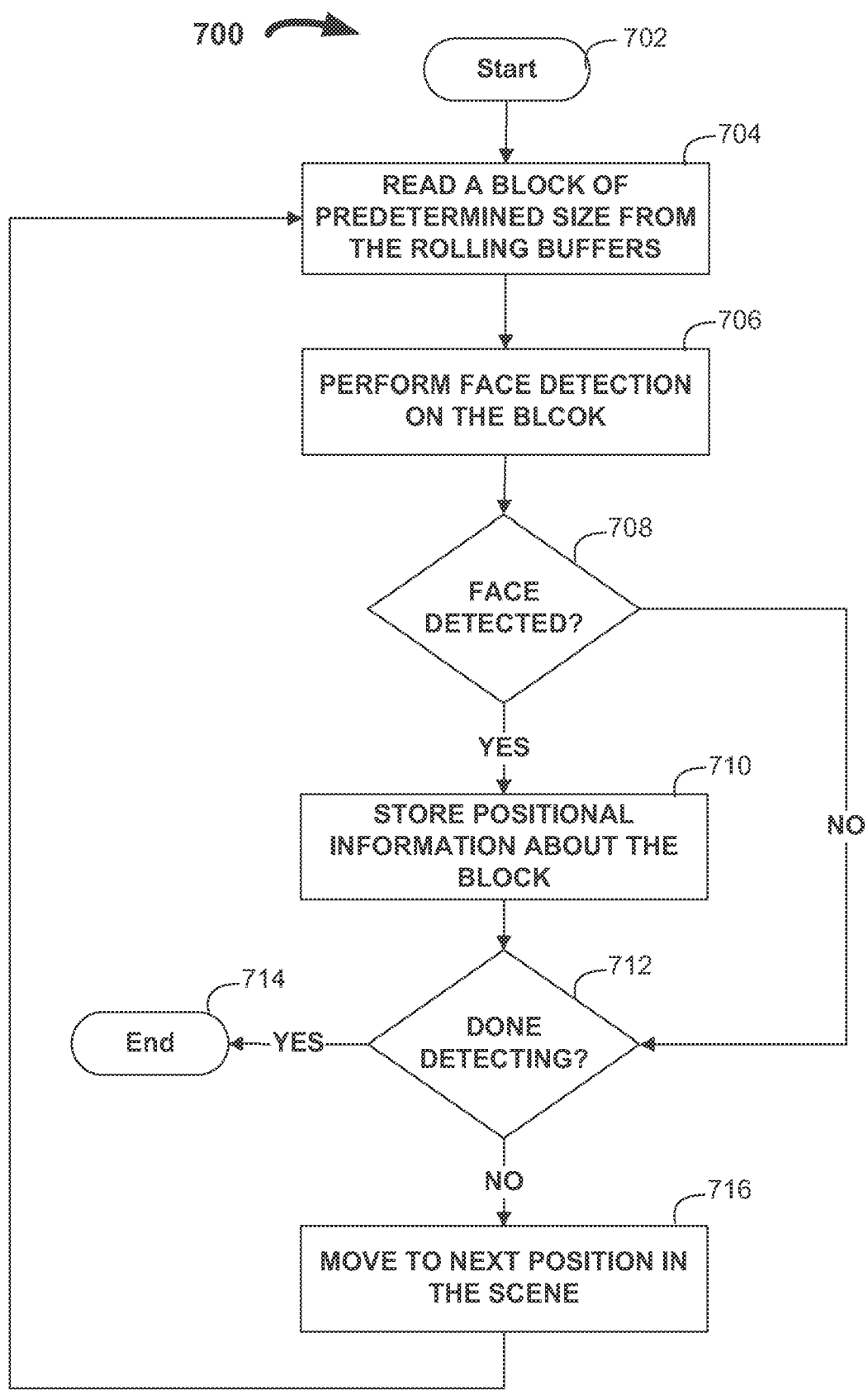
FIG. 7 is a flowchart of an illustrative process for performing face detection in accordance with embodiments of the invention.

FIGS. 6 and 7 are flowcharts of illustrative processes that can be executed by a sensor to achieve some of the above-described features and functionalities. In particular, the processes may be executed by an image sensor configured in accordance with embodiments of the invention, such as image sensor 110 or image sensor 200 of FIGS. 1 and 2, respectively. For example, the processes may be executed by a detector implemented within the image sensor. It should be understood that these processes are merely illustrative, and that any steps can be removed, modified, combined, or any steps may be added, without departing from the scope of the invention.

Referring first to FIG. 6, process 600 is shown for scanning a scene in successive time intervals in accordance with embodiments of the invention. Process 600 begins at step 602 in which scanning may or may not have already commenced. At step 604, the sensor can initiate various scan settings, which can include the stripe width and position settings (e.g., x-y coordinates of the scanning stripe, or the horizontal offset of the vertical stripe). The stripe width may be defined, for example, by a downsampling rate.

Then, at step 606, the image sensor can scan a portion of the scene based on the scan settings. For example, the image sensor can scan a vertical stripe of the scene that has a width and horizontal offset defined by the settings initialized in step 604. The image sensor may then, at step 608, determine whether it is finished scanning stripes of that width. This determination can be based on whether the image sensor has achieved sufficient coverage of the scene using the current width. If not, the image sensor can update the position setting (but not the stripe width) at step 610 so that the image sensor can scan another stripe of the same width at step 606.

If at step 610, the image sensor instead determines that it is done with the current stripe width, process 600 can continue to step 612. At step 612, the image sensor can determine whether all scans in the sequence are complete. For example, using the example of FIG. 3, the image sensor can determine whether all 14 vertical stripes of sequence 300 have been completed. If so, the image sensor may have sufficiently covered the entire scene using scans in successive time intervals, and process 600 can end at step 616. At this point, the image sensor may stop performing scans. In other embodiments, the image sensor can repeatedly perform the sequence of scans (e.g., sequence 300 of FIG. 3), and process 600 can return to step 604 to start the next iteration.

Returning to step 612, if the image sensor determines that the scan sequence is not complete, process 600 may move to step 614. This may occur, for example, if the image sensor has not yet performed scans having a particular stripe width. Thus, at step 614, the image sensor can update the stripe width and position settings of the scan settings. The image sensor may update the scan settings, for example, to increase the stripe width (e.g., by increasing the rate of downsampling). Process 600 may then move back to step 606 so that the image sensor can scan a portion of the scene using the updated scan settings.

Using the steps of process 600, the image sensor can complete a sequence of scans of a scene, where the sequence includes scans of different widths and of different positions. This way, since faces or other objects can be positioned at a variety of different locations in the scene and can be a variety of different sizes (e.g., based on how far the person is away from the camera), the sequence may enable the image sensor to detect any faces present in the scene.

Turning now to FIG. 7, process 700 is shown for performing face detection in accordance with embodiments of the invention. Process 700 may begin at step 702 in which image data (e.g., pixels or downsampled pixels) has been stored in a rolling buffer (e.g., image buffer 400 of FIG. 4) and may be continuously stored in the rolling buffer in a circular fashion. Moving to step 704, the image sensor can read a block of predetermined size from the rolling buffer. The block can be of any suitable size, such as 32×32 or 64×64, and can be at any suitable position in a scanning stripe. Then, at step 706, the image sensor may perform face detection on the block. For example, the image sensor can determine whether the features (e.g., edges or lack thereof) indicate that a face is likely present within the block, and can use any of the detection techniques described in the above-incorporated G.B. Patent Application No. 0910387.0.

If, at step 708, the image sensor determines that a face is present in the block, process 700 can continue to step 710. At step 710, the image sensor can store positional information about the block. In some embodiments, the image sensor can store the positional information in a FIFO, which can be read by components external to the image sensor. The positional information can include, for example, the location of the predetermined block (e.g., the x-y coordinates of a corner of the block), the size of the block (e.g., rate of downsampling used to obtain the block), and the strength of face detection. Process 700 can then continue to step 712, described below.

Returning to step 708, if the image sensor determines that a face is not present in the block, process 700 may skip step 710 and move directly to step 712. At step 712, the image sensor can determine whether it is done detecting for faces. This determination can be based on user request to perform another task that does not require face detection (or any other suitable factor). If the image sensor determines that face detection is no longer necessary, process 700 can move to step 714 and end. Otherwise, process 700 can continue to step 716 and the image sensor can move to the next position in the scanning stripe. That is, the image sensor can select another position in the scene at which to select a block. In some embodiments, the next position can produce a block that overlaps with the current block, but may be offset by a preset number of pixels. Process 700 may move back to step 704 so that face detection can eventually be performed on the next block. By repeating the steps of process 700 for multiple blocks at different positions, the image sensor may be able to detect for faces located at any spot in the scene.

In conclusion, various embodiments are disclosed for scanning a scene and detecting the presence of objects of an object class. In some embodiments, an electronic device is provided which includes an image sensor and control circuitry. The image sensor provides, to the control circuitry, image data corresponding to a scene, as well as positional information about objects (of the object class) in the scene. The image sensor can include an image scanner that is configured to scan, in successive time intervals (e.g., frames), portions of a scene. Each of the portions may cover a different amount or location of the scene such that the portions collectively provide a relatively complete picture of the scene.

The image sensor can further include an object detector configured to analyze each of the portions while that portion is being scanned. The object detector can, for example, identify whether there are objects of the object class in the scene, and can generate the positional information that is provided to the control circuitry.

In some embodiments, the image sensor can include two buffers. The first buffer may be a rolling buffer that is used to store the image data as the image data is being scanned. At the same time, the object detector can read blocks of data out of the first buffer and can perform, for example, face detection on each of the blocks. The first buffer can be sized to store a portion of the scene (rather than the entire scene), so image data may be continuously re-written as a scan occurs. Because the first buffer may be significantly smaller than a framestore, the first buffer may be suitable for implementation within an image sensor (e.g., SoC). The second buffer, which may be a FIFO buffer, may store the positional information of any of the blocks that include detected faces.

The described embodiments of the invention are presented for the purpose of illustration and not of limitation, and the invention is only limited by the claims which follow.

What is claimed is:

1. A method of scanning a scene using an image sensor, the method comprising:
scanning a first portion of the scene in a first time interval;
storing the first portion in a buffer for image processing;

scanning a second portion of the scene in a second time interval subsequent to the first time interval, wherein the second portion covers a different amount or location of the scene than the first portion; and saving, for image processing, the second portion in the buffer in place of the first portion.

2. The method of claim 1, wherein:

scanning the first portion comprises scanning a first vertical stripe; and scanning the second portion comprises scanning a second vertical stripe, wherein the first and second vertical stripes each has a width less than a width of the scene.

3. The method of claim 2, wherein the first vertical stripe has a same width as the second vertical stripe, and wherein the first vertical stripe has a different horizontal offset as the second vertical stripe.

4. The method of claim 2, wherein the first vertical stripe has a different width from a width of the second vertical stripe.

5. The method of claim 1 further comprising:

detecting the presence of objects in an object class in the first portion of the scene while the first portion is being stored in the buffer; and detecting the presence of objects in the object class in the second portion of the scene while the second portion is being stored in the second buffer.

6. The method of claim 1 wherein storing the first or second portions of the scene comprises:

saving luminance information for the portion of the scene.

7. An image sensor comprising:

an image scanner configured to scan, in succession, portions of a scene, wherein each of the portions covers a different amount or location of the scene, wherein the succession of portions comprises:

a first plurality of vertical stripes with differing horizontal offsets, each having a first predetermined width; and a second plurality of vertical stripes with differing horizontal offsets, each having a second predetermined width; and an object detector configured to analyze at least one of the portions, while that portion is being scanned, for the presence of an object in an object class.

8. The image sensor of claim 7, wherein the object class comprises faces.

9. The image sensor of claim 7, further comprising:

a rolling buffer sized to store less than a smallest of the portions of the scene, wherein each of the portions is stored in the buffer by rewriting previously stored data in a circular fashion.

10. The image sensor of claim 7, wherein the rolling buffer comprises a plurality of partitions, and wherein the detector is configured to analyze data from a subset of the partitions while a remainder of the partitions is being filled.

11. The image sensor of claim 7, further comprising:

a downsampler configured to sub-sample at least one of the portions and store the sub-sampled portions into the rolling buffer.

12. An image sensor comprising:

a first buffer sized to store at least a portion of a scene;

a second buffer; and detection hardware configured to:

determine, from contents of the first buffer, regions in the scene that potentially contain at least one object of an object class; and store positional information of the regions in the second buffer.

13. The image sensor of claim 12, wherein the positional information comprise at least one of: location of the regions, size of the regions, and strength of detection.

14. The image sensor of claim 12, wherein the detection hardware is configured to determine regions by:

picking a plurality of blocks of the scene, wherein the blocks are of a predetermined size; and identifying whether each of the plurality of blocks includes at least one object of the object class.

15. The image sensor of claim 12, further comprising:

an image scanner configured to determine which portion of the scene to store in the first buffer; and a downsampler configured to downsample the determined portion of the scene.

16. The image sensor of claim 12, further comprising:

a first output for outputting image data corresponding to the scene; and a second output for outputting contents of the second buffer.

17. An electronic device comprising:

an image sensor configured to capture a scene in portions, the image sensor comprising:

a detector for detecting regions in the scene that potentially contain objects of an object class and a buffer for storing positional information corresponding to the regions; and control circuitry configured to obtain the positional information from the image sensor and perform an action based on the positional information.

18. The electronic device of claim 17, wherein the buffer is a first-in first-out buffer.

19. The electronic device of claim 17, wherein the action comprises at least one of: waking up the electronic device, performing automatic exposure, performing color balance, performing focus control, and identifying contextual information.

* * * * *